United States Patent [19]

Wilson, Jr.

[11] 4,334,702
[45] Jun. 15, 1982

[54] SHORTHAND PAPER

[76] Inventor: Thomas E. Wilson, Jr., 927 2nd Ave. NW., Great Falls, Mont. 59404

[21] Appl. No.: 34,013

[22] Filed: Apr. 17, 1979

Related U.S. Application Data

[63] Continuation of Ser. No. 843,040, Oct. 17, 1977, abandoned.

[51] Int. Cl.³ ............................................. G09B 11/04
[52] U.S. Cl. ...................................... 283/45; 283/1 R
[58] Field of Search ................ 283/45, 1 R, 1 A, 62

[56] References Cited

U.S. PATENT DOCUMENTS

| 418,991 | 1/1890 | Smith | 283/45 |
|---|---|---|---|
| 1,151,782 | 8/1915 | Greeley | 283/45 |
| 1,340,100 | 5/1920 | Africa | 283/45 |

Primary Examiner—Paul A. Bell

[57] ABSTRACT

The paper described is a sort of graph paper on which shorthand may be written. The writing lines are divided into segments, each segment consisting of an arrangement of circles, squares or other shapes. The segments are repetitive. If the pen or pencil is set down in a square or other shape and writing is then begun, part of the sound need not be written, because it is implied by the square chosen. There is also a neutral position when implied sound is not wanted.

1 Claim, 2 Drawing Figures

COLORED BANDS

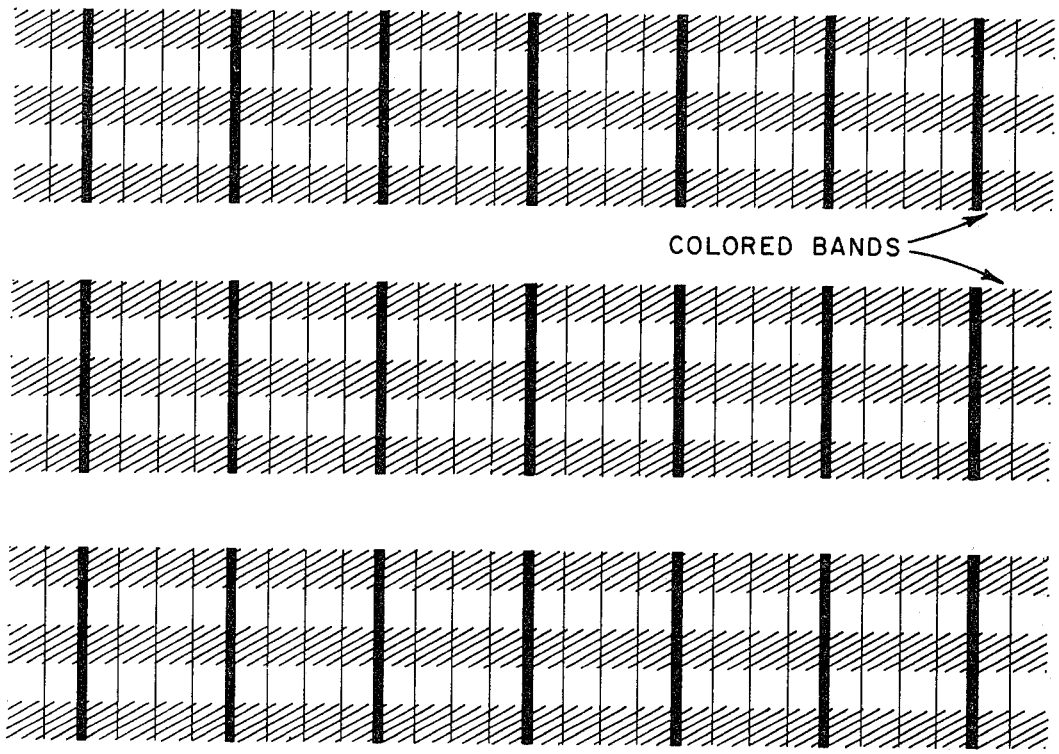
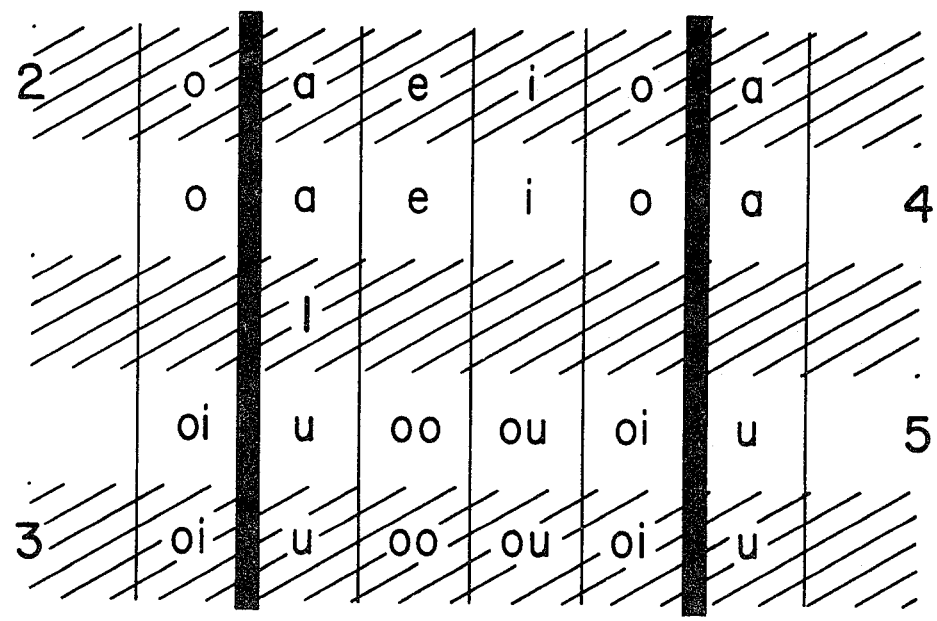

SHORTHAND PAPER

CROSS-REFERENCE

This is a continuation of Ser. No. 843,040 filed Oct. 17, 1977 now abandoned.

DESCRIPTION

Older shorthand systems make use of vertical position writing to imply sound. This is done by placing characters of the shorthand alphabet in a certain relation to a horizontal writing line. Seeking to increase reporting and stenographic speeds, the inventor discovered a shorthand paper that adds to this old idea the new one of horizontal position writing.

BRIEF DESCRIPTION OF THE DRAWINGS

FIG. 1 represents a portion of a page of shorhand paper according to the invention.

FIG. 2 is a possible arrangement of implied vowel sounds.

One of many possible configurations that the invention may take is shown in FIG. 1: a combination of vertical lines with horizontal colored bands. (In this application, a colored band is a band of color differing in hue or other characteristic from the background.) The result is a shorthand paper with a plaid appearance.

The user sets his writing instrument down in one of the small squares and begins to write his word. If he sets it down in a square that implies initial e and writes the consonant g, the word egg is expressed. If he writes m in a square that implies medial or final a, the words may and ma are expressed. The meanings that the squares may have are not fixed, nor is it necessary that they include vowel sounds. The complete meaning of the writing depends on the shorthand system used, as well as on what is written and where it is written.

The small squares must be grouped into an array, and the array must be repeated across the page (typically in the horizontal direction). The repetition of the array forms the minor cycle of the markings on the paper. Successive repetitions of the minor cycle are then made (typically in the vertical direction) to form the major cycle.

It is necessary to know where each array begins and ends, and this is indicated in the present example by using a heavier line weight to divide the arrays horizontally and by leaving space between one major cycle and another.

If, as shown in the example in FIG. 2, the array is entirely divided into small shapes, a neutral position, 1, is needed. Writing begun in the neutral position is transcribed at face value.

FIG. 2 shows one possible configuration of implied vowels, initial on the outer rows, 2 and 3, medio-final on the inner rows, 4 and 5.

Nongeometric patterns are possible, and the number of small shapes may be greater or less. For example, if ou and oi are deleted, the array has 12 to 15 squares, instead of 16 to 20. In that case, these two sounds might be written in shorthand.

The smaller the array, the faster the writing instrument moves from the end of one word to the beginning of the next. Time and motion studies will determine the optimum number of squares or other shapes in the array, as well as their size and arrangement. The psychology of color will identify the combination of colors that minimizes eyestrain.

I claim:

1. A writing page having a plurality of writing lines thereon, each line comprising a plurality of segments having a plurality of horizontal bands with a plurality of vertical lines super-imposed thereon to form a plurality of wiring squares, the segments being separated from each other by vertical lines of different character than the vertical lines contained within each segment, each writing line being vertically spaced from an adjacent writing line by a non-printed portion.

* * * * *